US011353105B2

(12) United States Patent
Fuchs et al.

(10) Patent No.: US 11,353,105 B2
(45) Date of Patent: Jun. 7, 2022

(54) PLANET CARRIER OF A PLANETARY GEARBOX AND PLANETARY GEARBOX HAVING A PLANET CARRIER OF THIS KIND

(71) Applicant: IMS GEAR SE & CO. KGAA, Donaueschingen (DE)

(72) Inventors: Gabriel Fuchs, Reichenau (DE); Matthias Kieninger, Villingen-Schwenningen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 17/433,883

(22) PCT Filed: Feb. 17, 2020

(86) PCT No.: PCT/EP2020/054079
§ 371 (c)(1),
(2) Date: Aug. 25, 2021

(87) PCT Pub. No.: WO2020/173737
PCT Pub. Date: Sep. 3, 2020

(65) Prior Publication Data
US 2022/0049766 A1      Feb. 17, 2022

(30) Foreign Application Priority Data
Feb. 26, 2019    (DE) .......................... 102019104898.2

(51) Int. Cl.
*F16H 57/08*       (2006.01)
*F16H 1/28*        (2006.01)

(52) U.S. Cl.
CPC ............ *F16H 57/082* (2013.01); *F16H 1/28* (2013.01); *F16H 2057/085* (2013.01)

(58) Field of Classification Search
CPC ................................ F16H 57/082; F16H 1/28
See application file for complete search history.

(56) References Cited

U.S. PATENT DOCUMENTS 3,939,736 A * 2/1976 Morin .................. F16H 57/082
                                                            475/331
6,031,308 A    2/2000 Kinoshita et al.
(Continued)

FOREIGN PATENT DOCUMENTS

DE        102014203587 A1    8/2015
EP            3486523 A1     5/2019

OTHER PUBLICATIONS

Office action dated Dec. 6, 2019 in corresponding application DE 10 2019 104 898.2.

*Primary Examiner* — Derek D Knight
(74) *Attorney, Agent, or Firm* — Nath, Goldberg & Meyer; Jerald L. Meyer

(57) ABSTRACT

A planet carrier of a planetary gearbox has a first contact surface and a second contact surface. The first contact surface and/or the second contact surface are divided by a connecting straight line running through the planet carrier axis of rotation and the planet gear axis of rotation into a first contact surface portion and a second contact surface portion. The first contact surface portion encloses a first angle with the connecting straight line, the second contact surface portion encloses a second angle with the connecting straight line, the first angle and the second angle lie in a plane perpendicular to the planet carrier axis of rotation, and the first angle and the second angle are unequal and at least one of the angles is greater than 90°. The invention further relates to a planetary gearbox having a planet carrier of this kind and at least one planet gear.

9 Claims, 4 Drawing Sheets

(56) References Cited

U.S. PATENT DOCUMENTS

| | | | |
|---|---|---|---|
| 8,613,687 B2 * | 12/2013 | Dopfert | F16H 57/082 475/903 |
| 2003/0232692 A1 * | 12/2003 | Chen | F16H 3/74 475/331 |
| 2013/0068581 A1 | 3/2013 | Araki et al. | |
| 2015/0330467 A1 | 11/2015 | Bourlon | |

* cited by examiner

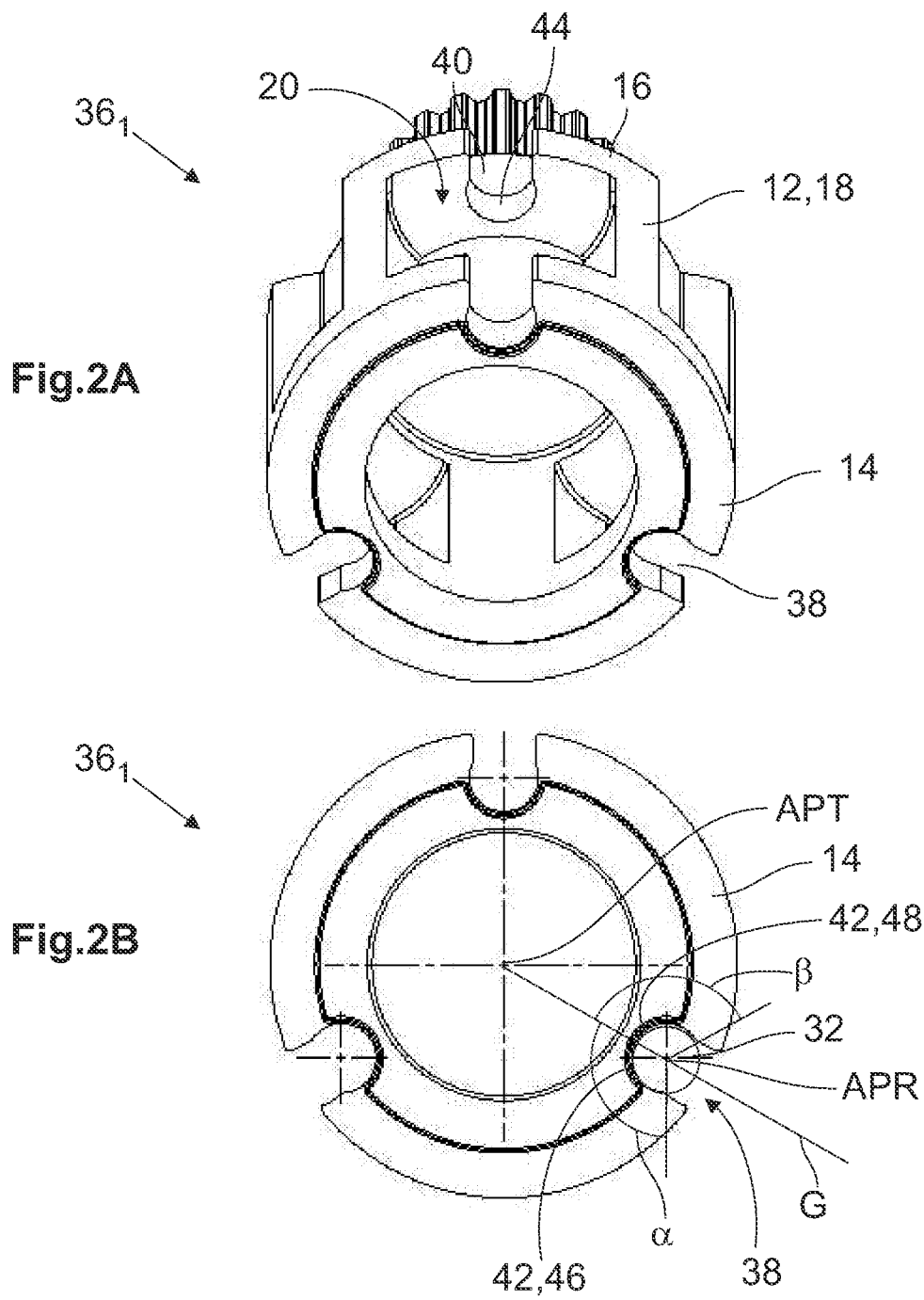

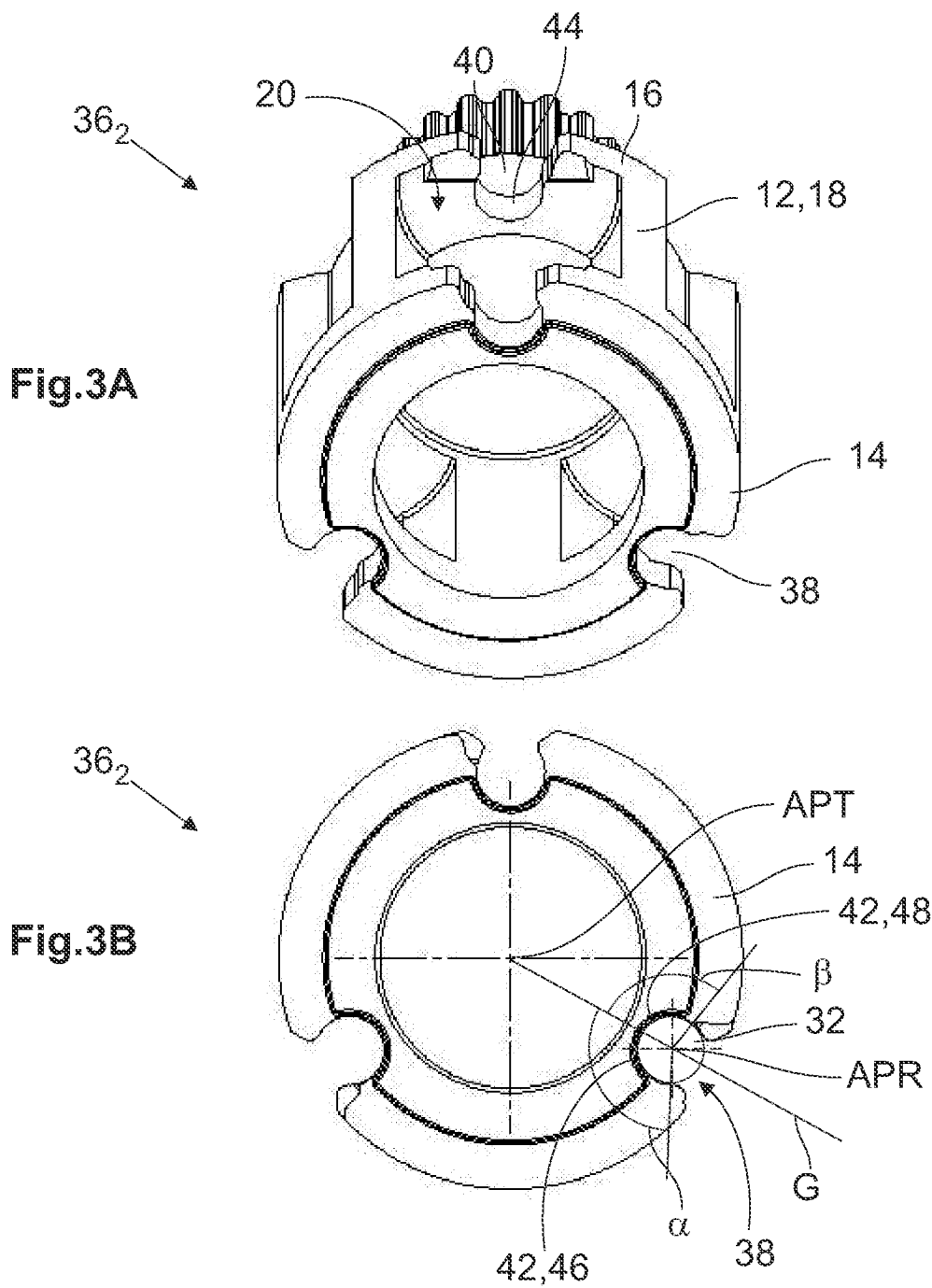

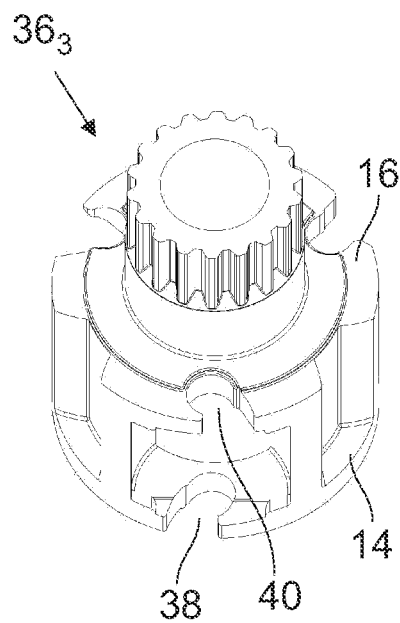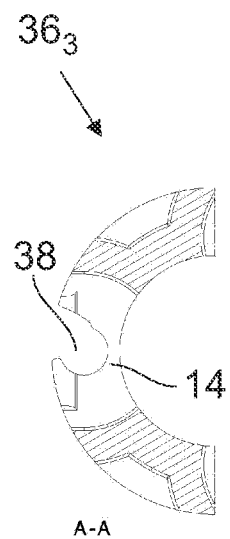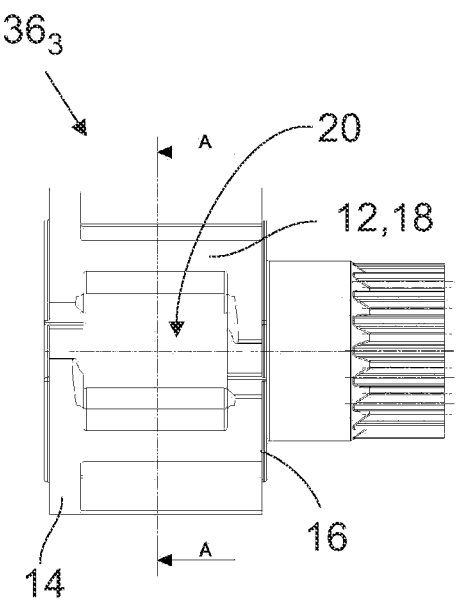
Fig.4A  Fig.4B  Fig.4C
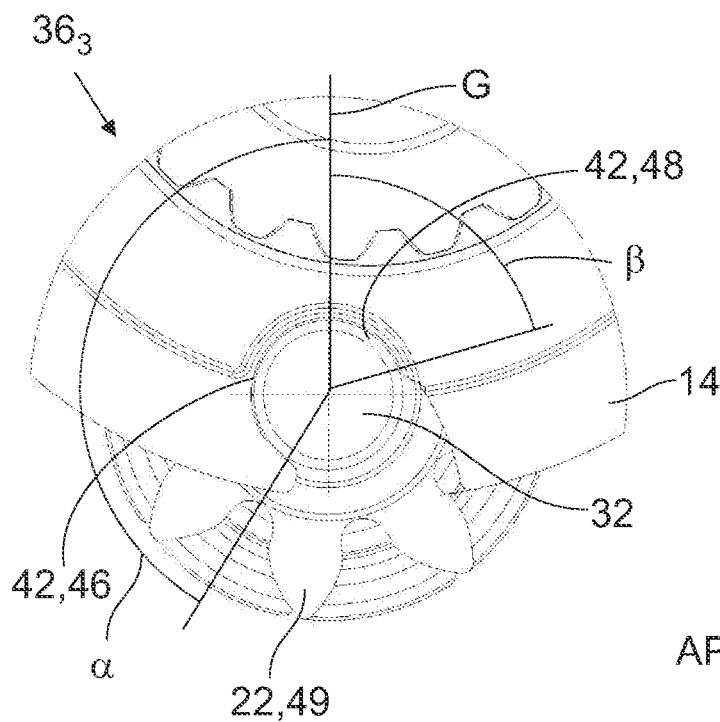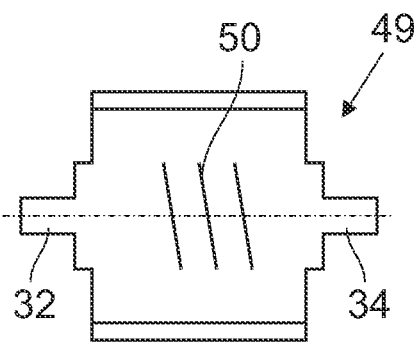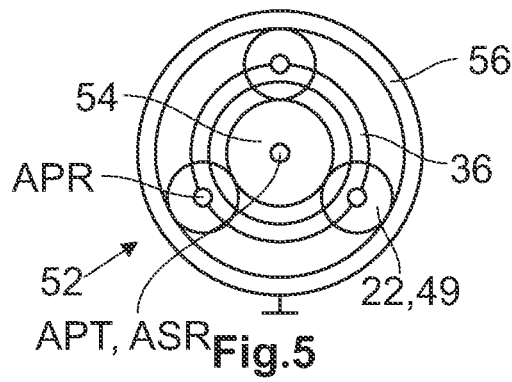
Fig.4D  Fig.4E  Fig.5

PLANET CARRIER OF A PLANETARY GEARBOX AND PLANETARY GEARBOX HAVING A PLANET CARRIER OF THIS KIND

This is a National Phase Application filed under 35 U.S.C. 371 as a national stage of PCT/EP2020/054079, filed Feb. 17, 2020, an application claiming the benefit of German Application No. 10 2019 104 898.2, filed Feb. 26, 2019, the content of each of which is hereby incorporated by reference in its entirety.

The present invention relates to a planet carrier of a planetary gearbox. Furthermore, the invention relates to a planetary gearbox with such a planet carrier.

Planetary gearboxes are used in many applications where a high transmission ratio or reduction ratio must be realized with little installation space. Planetary gearboxes are distinguished in particular in that they have a planet carrier, on which at least one planet gear, but usually three or four planet gears are mounted. The planet gears mesh radially inside with a sun gear, while they mesh radially outside with a ring gear. While the planet carrier and the sun gear are typically rotatable around a planet carrier axis of rotation, the planet gears are each rotatably mounted in the planet carrier around a planet gear axis of rotation.

Depending on the embodiment of the planet carrier, it has two carrier sections arranged at a distance from one another, in which a first bearing bore and a second bearing bore are arranged per planet gear. The bearing bores have a closed circumference. A receiving cavity in which the planet gear can be arranged is arranged between the two carrier sections. In many cases, the planet gear includes a planet gear shaft, which is inserted through the planet gear and protrudes on both sides over the planet gear. The protruding sections of the planet gear shaft engage the two bearing bores. Such planet carriers are known from EP 3 486 523 A1, US 2015/0330467 A1 and U.S. Pat. No. 6,031,308 A.

The disadvantage here is that, in order to assemble the planetary gearbox, the planet gear must be aligned with the first bearing bore and the second bearing bore before the planet gear shaft can be inserted through the first bearing bore, the planet gear and the second bearing bore, wherein the planet gear shaft is moved parallel to the planet carrier axis of rotation. The production of the planetary gearbox is correspondingly difficult. In addition, it is not possible to execute the planet gear shaft integrally with the planet gear.

The object of an embodiment of the present invention is to propose a planet carrier for a planetary gearbox that can be produced in a simple manner and yet provides a good engagement of the gears of the planetary gearbox. Furthermore, an embodiment of the present invention is based on the object of creating a planetary gearbox which can be operated with such a planet carrier.

This object is achieved with the features specified in claims 1, 3 and 6. Advantageous embodiments are the subject of the dependent claims.

An embodiment of the invention relates to a planet carrier of a planetary gearbox, comprising a carrier body extending along a planet carrier axis of rotation, a first carrier section connected to the carrier body, and a second carrier section connected to the carrier body, wherein
the first carrier section and the second carrier section are arranged at a distance from one another along the planet carrier axis of rotation and form at least one receiving cavity, into which at least one planet gear can be introduced,
the at least one planet gear has a first bearing section and a second bearing section, by means of which the planet gear can be mounted in the planet carrier in a rotatable manner about a planet gear axis of rotation,
the first carrier section has a first bearing recess per planet gear and the second carrier section has a second bearing recess per planet gear, and
the first bearing recess forms a first contact surface with which it comes into contact with the first bearing section when the planet gear is arranged in the receiving cavity,
the second bearing recess forms a second contact surface with which it comes into contact with the second bearing section when the planet gear is arranged in the receiving cavity,
the first contact surface and/or the second contact surface are divided by a connecting straight line running through the planet carrier axis of rotation and the planet gear axis of rotation into a first contact surface portion and a second contact surface portion,
the first contact surface portion encloses a first angle with the connecting straight line,
the second contact surface portion encloses a second angle with the connecting straight line,
the first angle and the second angle lie in a plane perpendicular to the planet gear axis of rotation, and
the first angle and the second angle are unequal and at least one of the angles is greater than 90°.

Due to the fact that bearing recesses are used instead of bearing bores as proposed, it is possible to introduce the planet gear shaft into the bearing recesses by means of a radial movement directed toward the planet carrier axis of rotation. This makes it possible to pre-assemble the planet gear in question to the extent that the planet gear shaft can already be inserted through the planet gear before the planet gear shaft is introduced into the bearing recesses. In particular, there is no need to align the planet gear with the bearing bore. This makes it possible to significantly simplify the production of the planetary gearbox. Due to the fact that at least one of the angles is greater than 90°, the contact surface is enlarged to such an extent at the same time that a radially outward migration of the planet gear shaft is prevented. This ensures a favorable engagement of the gears of the planetary gearbox. As a result of the fact that the first angle and the second angle are different, the bearing recesses are designed asymmetrically when considered separately. As a result, at least one contact surface portion can be designed in such a way that it extends radially outwardly far around the planet gear shaft. The above-mentioned radial migration of the planet gears can thus be prevented particularly effectively.

According to a further embodiment, the first angle and the second angle of the first bearing recess are arranged in relation to the planet carrier axis of rotation opposite to the first angle and to the second angle of the second bearing recess. Depending on the direction of rotation of the planetary gearbox, a direction-dependent lateral force component can arise. Due to the opposing orientation, a migration of the planet gears can be prevented regardless of the direction of rotation.

A design of the invention relates to a planet carrier of a planetary gearbox, comprising
a carrier body extending along a planet carrier axis of rotation,
a first carrier section connected to the carrier body, and
a second carrier section connected to the carrier body, wherein the first carrier section and the second carrier section are arranged at a distance from one another along the planet carrier axis of rotation and form at least one receiving cavity, into which at least one planet gear can be introduced, the at least one planet gear has a first bearing section and a second bearing section, by means of which the planet gear can be mounted in the planet carrier in a rotatable manner about a planet gear axis of rotation, the first carrier section has a first bearing recess per planet gear and the second carrier section has a second bearing recess per planet gear, and the first bearing recess forms a first contact surface with which it comes into contact with the first bearing section when the planet gear is arranged in the receiving cavity, the second bearing recess forms a second contact surface with which it comes into contact with the second bearing section when the planet gear is arranged in the receiving cavity, the first contact surface and/or the second contact surface are divided by a connecting straight line running through the planet carrier axis of rotation and the planet gear axis of rotation into a first contact surface portion and a second contact surface portion, the first contact surface portion encloses a first angle with the connecting straight line, the second contact surface portion encloses a second angle with the connecting straight line, the first angle and the second angle lie in a plane perpendicular to the planet carrier axis of rotation and the planet gear axis of rotation; and the first angle and the second angle are equal to and greater than 90°.

Due to the fact that bearing recesses are used instead of bearing bores as proposed, it is possible to introduce the planet gear shaft into the bearing recesses by means of a radial movement directed toward the planet carrier axis of rotation. This makes it possible to pre-assemble the planet gear in question to the extent that the planet gear shaft can already be inserted through the planet gear before the planet gear shaft is introduced into the bearing recesses. In particular, there is no need to align the planet gear with the bearing bore. This makes it possible to significantly simplify the production of the planetary gearbox.

Due to the fact that both angles are greater than 90°, the contact surface is simultaneously enlarged to such an extent that the planet gears are prevented from migrating radially outwards. This ensures a favorable engagement of the gears of the planetary gearbox.

In accordance with a further embodiment or further design, the planet carrier consists of an injection-moldable plastic and is injection-molded. The use of injection molding makes it possible to provide a high number of planet carriers at low unit cost. In addition, the weight of the planet carrier can be kept low with the use of plastic. Due to the fact that plastic deforms more strongly than steel at a given load and in the case of a comparable dimensioning of the planet carrier, the above-mentioned advantages of the asymmetrical design of the bearing recesses in the case of plastic planet carriers are particularly evident.

In a further developed embodiment or further developed design, the planet carrier is designed in one piece. Due to the one-piece design of the planet carrier, the production is simplified, since a joining step for connecting two or more parts of the planet carrier can be omitted. In addition, storage is simplified, since only the planet carrier as such has to be kept in stock and it is not necessary to ensure that several parts are available.

An embodiment of the invention relates to a planetary gearbox, comprising
 a planet carrier according to one of the previous embodiments or designs, and
 at least one planet gear, which is rotatably mounted on the planet carrier about a planet carrier axis of rotation.

The technical effects and advantages that can be achieved with the proposed planetary gearbox correspond to those that have been discussed for the planet carrier. In summary, it should be pointed out that the production of the planetary gearbox can be simplified in particular by the fact that the planet gears and the planet gear shafts can be pre-assembled and mounted by means of a radial movement directed at the planet carrier axis of rotation.

According to a further embodiment, the planet gear has helical planetary gearing. In the case of planetary gearboxes with helical gearing, particular loads occur. While almost no forces act along the planet carrier axis of rotation in the case of a straight-toothed planetary gearbox, axially and radially acting forces combine in the case of planetary gearboxes with helical gearing. Particularly when the planet carrier or the entire planetary gearbox is made of plastic, the radially and axially directed forces cause increased deformation, in particular of the planet carrier, which is why the planet gears can migrate radially. This disrupts the optimal engagement of the wheels of the planetary gearbox. On the basis of the proposed embodiment of the bearing recesses of the planet carrier, a radial migration of the planet gears is prevented or at least reduced to such an extent that the engagement of the gears of the planetary gearbox is not negatively influenced.

In accordance with a further developed embodiment, the planet gear axis of rotation runs skew to the planet carrier axis of rotation. In this embodiment, the planetary gearbox is designed as a crossed helical planetary gearbox. Crossed helical planetary gearboxes make it possible to provide even higher transmission ratios or reduction ratios on the same installation space compared to straight-toothed planetary gearboxes or planetary gearboxes with helical gearing.

A further embodiment is characterized in that the first bearing section and the second bearing section are formed integrally with the planet gear. In known planet gears, the bearing sections are formed by a planet gear shaft, which is inserted through the planet gear. The planet gear shaft therefore forms an additional component, which can be omitted in this embodiment, whereby assembly and storage can be simplified.

Exemplary embodiments of the invention are explained in more detail below with reference to the accompanying drawings. In the drawings:

FIG. 2A shows a first exemplary embodiment of a planet carrier according to the invention on the basis of a perspective illustration;

FIG. 2B shows the first exemplary embodiment of the planet carrier shown in FIG. 2B on the basis of a front view;

FIG. 3A shows a second exemplary embodiment of a planet carrier according to the invention on the basis of a perspective illustration;

FIG. 3B shows the second exemplary embodiment of the planet carrier shown in FIG. 3A on the basis of a front view;

FIGS. 4A to 4C show a third exemplary embodiment of a planet carrier according to the invention on the basis of various representations;

FIG. 4D shows the planet carrier illustrated in FIGS. 4A to 4C, with a planet gear mounted on it, on the basis of a partial representation;

FIG. 4E shows a basic representation of a planet gear, which can be mounted on an exemplary embodiment of the planet carrier according to the invention; and FIG. 5 shows a basic illustration of a planetary gearbox.

Figure 1A:
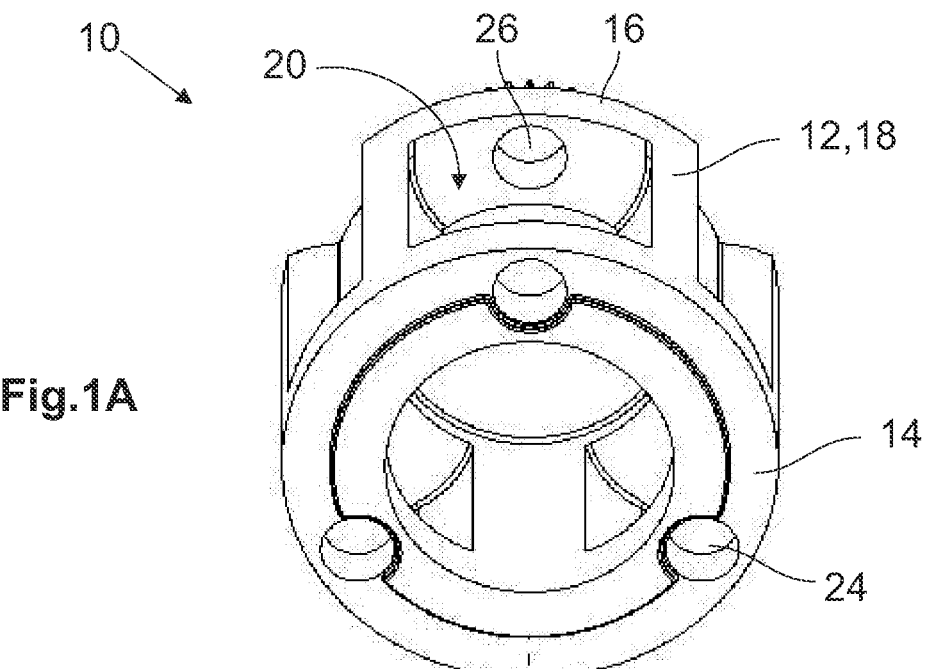
FIG. 1A shows a planet carrier according to prior art in a perspective illustration.
Figure 1B:
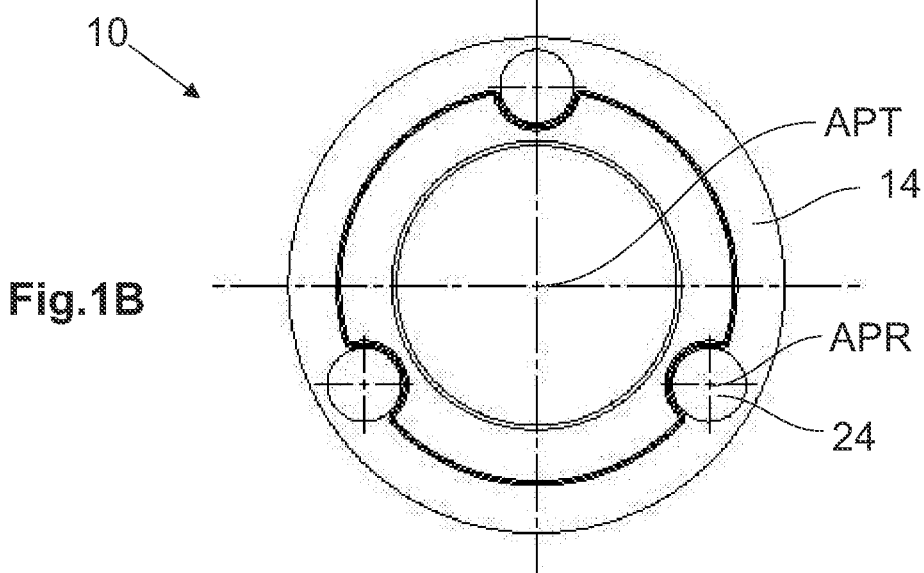
FIG. 1B shows the planet carrier shown in FIG. 1A by means of a front view.

In FIGS. 1A and 1B, a planet carrier 10 according to prior art is shown on the basis of a perspective illustration or a front view. The planet carrier 10 has a carrier body 12, to which a first carrier section 14 and a second carrier section 16 are fitted at a distance from one another with respect to a planet carrier axis of rotation APT. During operation, the planet carrier 10 is rotatable about the planet carrier axis of rotation APT. Both the first carrier section 14 and the second carrier section 16 are designed to be approximately disk-shaped and connected via bridges 18. Between the first carrier section 14 and the second carrier section 16 and between the bridges 18, the planet carrier 10 forms a total of three receiving cavities 20, into each of which a planet gear 22 (see FIG. 1C) can be introduced.

The first carrier section 14 has three first bearing bores 24 and the second carrier section 16 has three second bearing bores 26, which are used for mounting a planet gear 22 in each case. In this case, the first bearing bores 24 are aligned in each case with the second bearing bores 26 along the planet carrier axis of rotation APT.

Figure 1C:
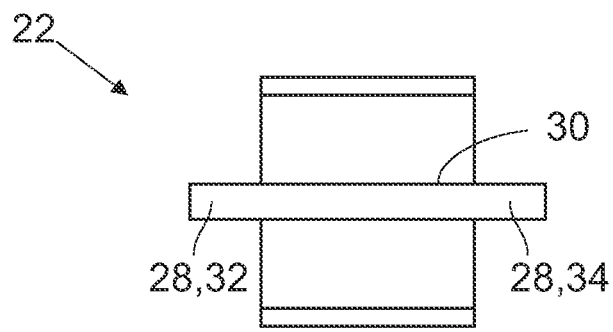
FIG. 1C shows a planet gear, which can be rotatably mounted on the planet carrier according to FIGS. 1A and 1B.

As mentioned, a planet gear 22 is shown in FIG. 1C, which can be mounted on the planet carrier 10 shown in FIGS. 1A and 1B. The planet gear 22 comprises a planet gear shaft 28, which can be designed as a pin, for example of metal, which can be inserted through a corresponding through-bore 30 of the planet gear 22. As can be seen from FIG. 1C, the planet gear shaft 28 protrudes on both sides in the axial direction over the planet gear 22. The protruding sections form a first bearing section 32 and a second bearing section 34.

As can be seen from FIGS. 1A and 1B, the bearing bores 24, 26 are completely closed. In order to be able to mount the planet gear 22 shown in FIG. 1C on the planet carrier 10, the planet gear 22 must be introduced into the receiving cavity 20 without the planet gear shaft 28 in such a way that the through-bore 30 of the planet gear 22 is aligned with one of the first bearing bores 24 of the first carrier section 14 and one of the second bearing bores 26 of the second carrier section 16. Subsequently, the planet gear shaft 28 is first guided through the first bearing bore 24, then through the through-bore 30 of the planet gear 22 and finally through the second bearing bore 26. In the assembled state, the first bearing section 32 engages the first bearing bore 24 and the second bearing section 34 engages the second bearing bore 26. Furthermore, the mounted planet gear 22 is rotatably mounted in the planet carrier 10 about a planet gear axis of rotation APR, which runs parallel to the planet carrier axis of rotation APT.

It can be seen from this that the assembly necessary for mounting the planet gear 22 on the planet carrier 10 is comparatively complex.

FIGS. 2A and 2B show a first exemplary embodiment of a planet carrier 36$_1$ according to the invention on the basis of a perspective illustration or a front view. The basic structure of the planet carrier 36$_1$ according to the first exemplary embodiment corresponds to that of the planet carrier 10 which has been shown and described in FIGS. 1A and 1B. Therefore, only the differences that are significant to the invention are discussed. In contrast to the planet carrier 10 known from prior art according to FIGS. 1A and 1B, the planet carrier 36$_1$ according to the first exemplary embodiment of the invention has no bearing bores 24, 26, but bearing recesses 38, 40. Specifically, the first carrier section 14 comprises three first bearing recesses 38 and the second carrier section 16 comprises three second bearing recesses 40, which are arranged in alignment along the planet gear axis of rotation APR. As mentioned, the bearing bores 24, 26 are completely closed along the circumference, while the first bearing recess 38 and the second bearing recess 40 are open radially to the outside.

As can be seen in particular from FIG. 2B, the first bearing recess 38 forms a first contact surface 42, with which, in the assembled state, the first bearing recess 38 comes into contact with the first bearing section 32 of the planet gear 22. Accordingly, the second bearing recess 40 forms a second contact surface 44, with which the second bearing recess 40 comes into contact with the second bearing section 34 of the planet gear 22 in the assembled state.

It can also be seen in FIG. 2B that, in the assembled state, the planet gear 22 is mounted in the planet carrier 36$_1$ and in particular in the first bearing recess 38 in a rotatable manner around the planet gear axis of rotation APR. In the first exemplary embodiment of the planet carrier 36$_1$ according to the invention, the planet gear axis of rotation APR runs parallel to the planet carrier axis of rotation APT. Furthermore, a connecting straight line G is shown in FIG. 2B, which runs through the planet carrier axis of rotation APT and the planet gear axis of rotation APR. The connecting straight line G divides the first contact surface 42 into a first contact surface portion 46 and a second contact surface portion 48.

Due to the fact that the first bearing recess 38 is open radially to the outside, the first contact surface portion 46 and the second contact surface portion 48 do not completely enclose the first bearing section 32, but only with a first angle $\alpha$ or a second angle $\beta$, which enclose the first contact surface portion 46 or the second contact surface portion 48 with the connecting straight line G. According to the first exemplary embodiment of the planet carrier 36$_1$ according to the invention, the first angle $\alpha$ and the second angle $\beta$ are the same size and are greater than 90° and smaller than 180°. Due to the fact that the first angle $\alpha$ and the second angle $\beta$ are each greater than 90°, an undercut is produced, which fixes the first bearing section 32 radially outwardly. Migration of the first bearing section 32 during operation of the planet carrier 36$_1$ is hereby prevented.

In the first exemplary embodiment of the planet carrier 36$_1$ according to the invention, the second bearing recess 40 is constructed in the same way as the first bearing recess 38 and therefore has the same properties.

Furthermore, the planet carrier 36$_1$ is designed in one piece and is made of an injection-moldable plastic.

FIGS. 3A and 3B show a second exemplary embodiment of the planet carrier 36$_2$ according to the invention on the basis of a perspective representation or a front view. The essential construction of the planet carrier 36$_2$ according to the second exemplary embodiment corresponds to that of the planet carrier 36$_1$ according to the first exemplary embodiment. However, the first bearing recess 38 and the second bearing recess 40 are constructed differently.

In FIG. 3B, the first bearing recess 38 according to the second exemplary embodiment of the planet carrier 36$_2$ according to the invention is clearly recognizable. In contrast to the first exemplary embodiment of the planet carrier 36$_1$ according to the invention, the first angle α is not equal to the second angle β, but they differ. As can be seen from FIG. 3B, the first angle α is greater than the second angle β. Both the first angle α and the second angle β are greater than 90° and less than 180°.

As can be seen in particular from FIG. 3A, the first angle α and the second angle β in the first bearing recess 38, in relation to the planet gear axis of rotation APR, run opposite to the first angle α and to the second angle β of the second bearing recess 40. In other words, the first bearing recesses 38 are open to the left in relation to the representation selected in FIGS. 3A and 3B, while the second bearing recesses 40 are open to the right.

In FIGS. 4A to 4C, a third exemplary embodiment of the planet carrier 36$_3$ according to the invention is shown on the basis of various illustrations. The planet carrier 36$_3$ according to the third exemplary embodiment corresponds to the planet carrier 36$_2$ according to the second exemplary embodiment. However, as can be seen from FIG. 4D, which shows an enlarged section of the planet carrier 36$_3$ shown in FIGS. 4A to 4C, the second angle β is less than 90°, while the first angle α is clearly above 90°, but less than 180°.

FIG. 4E shows a planet gear 49 which can be used with the illustrated exemplary embodiments of the planet carrier 36. In contrast to the planet gear 22 shown in FIG. 1C, the first bearing section 32 and the second bearing section 34 are formed integrally with the planet gear 49. Consequently, the planet gear 49 is designed in one piece, so that a separate planet gear shaft 28 does not have to be provided. Nevertheless, the planet gear 22 shown in FIG. 1C can also be used with all the illustrated embodiments of the planet carrier 36$_1$-36$_3$ according to the invention. It should be noted that the planet gear 49 shown in FIG. 4E has helical planetary gearing 50.

In order to assemble the planet carrier 36$_1$, for example, the planet gear 49 shown in FIG. 4E is introduced into the first bearing recess 38 and into the second bearing recess 40 by means of a movement directed toward the planet carrier axis of rotation APT. In order to assemble the planet carrier 36$_2$, 36$_3$ according to the second and the third exemplary embodiment, the planet gear 22 has to still be rotated somewhat about the connecting straight line G, so that a spiral or helical movement has to be carried out. In both cases, however, the assembly is significantly simpler in comparison with the assembly of the planet carrier 10 shown in FIGS. 1A and 1B according to prior art, in particular because the proper alignment of the planet gear 22 in relation to the first bearing bore 24 and the second bearing bore 26 can be omitted.

FIG. 5 shows a planetary gearbox 52 on the basis of a basic illustration, in which a total of three planetary gears 49 are mounted by means of a planet carrier 36 according to one of the above-described exemplary embodiments. In addition to the planet gears 49, a central sun gear 54 and a ring gear 56 can be seen. The planet gears 49 are in meshing engagement with both the sun gear 54 and the ring gear 56.

The ring gear 56 is not rotatable, while the sun gear 54 can rotate about a sun gear axis of rotation ASR, which coincides with the planet carrier axis of rotation APT. The planet gears 49 are each rotatably mounted in the planet carrier 36 about a planet gear axis of rotation APR. The planet gear axes of rotation APR run parallel to the planet carrier axis of rotation APT.

The planetary gearbox 52 is made entirely of an injection-moldable plastic.

Not shown is an exemplary embodiment in which the planet gear axes of rotation APR run skew to the planet carrier axis of rotation APT. In this exemplary embodiment, the planetary gearbox 52 is designed as a crossed helical planetary gearbox.

LIST OF REFERENCE NUMERALS

10 Planet carrier according to prior art
12 Carrier body
14 First carrier section
16 Second carrier section
18 Bridge
20 Receiving cavity
22 Planet gear
24 First bearing bore
26 Second bearing bore
28 Planet gear shaft
30 Through-bore
32 First bearing section
34 Second bearing section
36 Planet carrier
36$_1$-36$_3$ Planet carrier
38 First bearing recess
40 Second bearing recess
42 First contact surface
44 Second contact surface
46 First contact surface portion
48 Second contact surface portion
49 Planet gear
50 Helical planetary gearing
49 Planet gear
52 Planetary gearbox
54 Sun gear
56 Ring gear
APT Planet carrier axis of rotation
APR Planet gear axis of rotation
G Connecting straight line
α First angle
β Second angle

The invention claimed is:

1. A planet carrier (36) of a planetary gearbox (52), comprising
a carrier body (12) extending along a planet carrier axis of rotation (APT),
a first carrier section (14) connected to the carrier body (12), and
a second carrier section (16) connected to the carrier body (12), wherein
the first carrier section (14) and the second carrier section (16) are arranged at a distance from one another along the planet carrier axis of rotation (APT) and form at least one receiving cavity (20), into which at least one planet gear (22, 49) can be introduced,
the at least one planet gear (22, 49) has a first bearing section (32) and a second bearing section (34), by means of which the planet gear (22, 49) can be mounted in the planet carrier (36) in a rotatable manner about a planet gear axis of rotation (APR),
the first carrier section (14) has a first bearing recess (38) per planet gear (22, 49) and the second carrier section (16) has a second bearing recess (40) per planet gear (22, 49), and
the first bearing recess (40) forms a first contact surface (42) with which it comes into contact with the first bearing section (32) when the planet gear (22, 49) is arranged in the receiving cavity (20), the second bearing recess (38) forms a second contact surface (44) with which it comes into contact with the second bearing section (34) when the planet gear (22, 49) is arranged in the receiving cavity (20), the first contact surface (42) and/or the second contact surface (44) are divided by a connecting straight line (G) running through the planet carrier axis of rotation (APT) and the planet gear axis of rotation (APR) into a first contact surface portion (46) and a second contact surface portion (48), the first contact surface portion (46) encloses a first angle ($\alpha$) with the connecting straight line (G), the second contact surface portion (48) encloses a second angle ($\beta$) with the connecting straight line (G), the first angle ($\alpha$) and the second angle ($\beta$) lie in a plane perpendicular to the planet carrier axis of rotation (APT), and the first angle ($\alpha$) and the second angle ($\beta$) are unequal and at least one of the angles ($\alpha$, $\beta$) is greater than 90°.

2. The planet carrier (36) according to claim 1, characterized in that the first angle ($\alpha$) and the second angle ($\beta$) of the first bearing recess (38) are arranged in relation to the planet carrier axis of rotation (APT) opposite to the first angle ($\alpha$) and to the second angle ($\beta$) of the second bearing recess (40).

3. A planet carrier (36) of a planetary gearbox (52), comprising a carrier body (12) extending along a planet carrier axis of rotation (APT), a first carrier section (14) connected to the carrier body (12), and a second carrier section (16) connected to the carrier body (12), wherein the first carrier section (14) and the second carrier section (16) are arranged at a distance from one another along the planet carrier axis of rotation (APT) and form at least one receiving cavity (20), into which at least one planet gear (22, 49) can be introduced, the at least one planet gear (22, 49) has a first bearing section (32) and a second bearing section (34), by means of which the planet gear (22, 49) can be mounted in the planet carrier (36) in a rotatable manner about a planet gear axis of rotation (APR), the first carrier section (14) has a first bearing recess (38) per planet gear (22, 49) and the second carrier section (16) has a second bearing recess (40) per planet gear (22, 49), and the first bearing recess (38) forms a first contact surface (42) with which it comes into contact with the first bearing section (32) when the planet gear (22, 49) is arranged in the receiving cavity (20), the second bearing recess (40) forms a second contact surface (44) with which it comes into contact with the second bearing section (34) when the planet gear (22, 49) is arranged in the receiving cavity (20), the first contact surface (42) and/or the second contact surface (44) are divided by a connecting straight line (G) running through the planet carrier axis of rotation (APT) and the planet gear axis of rotation (APR) into a first contact surface portion (46) and a second contact surface portion (48), the first contact surface portion (46) encloses a first angle ($\alpha$) with the connecting straight line (G), the second contact surface portion (48) encloses a second angle ($\beta$) with the connecting straight line (G), the first angle ($\alpha$) and the second angle ($\beta$) lie in a plane perpendicular to the planet gear axis of rotation (APR), and the first angle ($\alpha$) and the second angle ($\beta$) are equal to and greater than 90°.

4. The planet carrier (36) according to claim 1, characterized in that the planet carrier (36) consists of an injection-moldable plastic and is injection-molded.

5. The planet carrier (36) according to claim 1, characterized in that the planet carrier (36) is designed in one piece.

6. A planetary gearbox (52), comprising a planet carrier (36) according to claim 1, and at least one planet gear (22, 49), which is rotatably mounted on the planet carrier (36) about a planet carrier axis of rotation (APR).

7. The planetary gearbox (52) according to claim 6, characterized in that the planet gear (22, 49) has helical planetary gearing (50).

8. The planetary gearbox (52) according to claim 6, characterized in that the planet gear axis of rotation (APR) runs skew to the planet carrier axis of rotation (APT).

9. The planetary gearbox (52) according to claim 6, characterized in that the first bearing section (32) and the second bearing section (34) are formed integrally with the planet gear (49).

* * * * *